United States Patent [19]

Matsubara

[11] 4,040,716
[45] Aug. 9, 1977

[54] KALEIDOSCOPIC PEEP-SHOW VIEWING DEVICE

[75] Inventor: Izuru Matsubara, Kyoto, Japan

[73] Assignees: Dai Nippon Insatsu Kabushiki Kaisha; Meiji Seika Kabushiki Kaisha, both of Tokyo, Japan

[21] Appl. No.: 664,881

[22] Filed: Mar. 8, 1976

[51] Int. Cl.² .............................................. G02B 27/08
[52] U.S. Cl. ........................................................ 350/4
[58] Field of Search ........................................ 350/4, 5

[56] References Cited

U.S. PATENT DOCUMENTS

| | | | |
|---|---|---|---|
| 2,452,363 | 10/1948 | Flotron | 350/4 |
| 2,697,380 | 12/1954 | Wyser | 350/4 X |
| 3,111,878 | 11/1963 | Welles et al. | 350/5 |

FOREIGN PATENT DOCUMENTS 1,051,825   9/1953   France ...................................... 350/4

Primary Examiner—Richard A. Wintercorn
Attorney, Agent, or Firm—Spensley, Horn and Lubitz

[57] ABSTRACT

A kaleidoscopic peep-show viewing device comprises an outer box of tubular shape with open opposite ends and with inscriptions printed on the inner surface thereof, an inner box adapted to slide telescopically within the outer box, and an optically reflecting member of peaked solid shape having a base, vertex, and mirror surface therebetween and joined at its base to one end of the inner box to slide thus unitarily therewith, the printed inscriptions, when viewed through one open end of the outer box as reflected images on the mirror surface, being optically collected thereby into single coherent pictures successively appearing and disappearing as the inner box is thus slid.

10 Claims, 15 Drawing Figures

KALEIDOSCOPIC PEEP-SHOW VIEWING DEVICE

BACKGROUND OF THE INVENTION

This invention relates generally to kaleidoscopic and panoramic viewing devices and more particularly to a kaleidoscopic peep-show viewing device having tubular telescoping outer and inner boxes and a reflecting member of peaked solid shape secured to the inner box and functioning to collect inscriptions printed on the inner surface of the outer box into single reflected images.

One viewing device of similar kind heretofore proposed and disclosed in the specification of Japanese Utility Model Publication No. 18196/1967, published Oct. 21, 1967, and entitled "Yohki" (Container) (Inventor: Akihiko Sakata) comprises an outer box of the shape of a rectangular parallelepiped, and inner box of similar shape slidably disposed within the outer box, and a reflecting structure secured to the inner box and consisting of two planar mirrors intersecting with a specific dihedral angle therebetween, the line of intersection facing and being nearest a viewer looking into the outer box through one open end thereof, the two planar mirrors sloping outward and toward the rear as viewed by the viewer. Inscriptions are so printed on two opposite inner surfaces of the outer box as to be reflected by the mirrors toward the viewer.

These inscriptions appear to the viewer to be moving as the inner box and the mirrors are moved slidingly in the outer box. This movement of the inscriptions is a mere divergence thereof in opposite directions as the mirrors are advanced toward the viewer and a mere convergence thereof toward the above mentioned line of intersection of the mirrors as they are retracted from the viewer. Accordingly, this viewing device is suitable principally for showing changing panoramic vistas. The specification of the above cited utility model publication even suggests securing a miniature image of an automobile to the line of intersection of the mirrors to produce the visual sensation of driving along a scenic route.

SUMMARY OF THE INVENTION

It is an object of this invention to provide a kaleidoscopic peep-show viewing device of a type generally as described above but having an optically reflecting member capable of reflecting more than two images and collecting these images into a single coherent picture as viewed by a viewer.

Another object of the invention is to provide a kaleidoscopic peep-show viewing device of the character set forth above by which a wide variety of successively varying pictures can be viewed by the viewer.

Still another object of the invention is to provide a viewing device of the above stated character by which a "zooming" image effect and a three-dimensional picture effect can be imparted to the viewer.

A further object of the invention is to provide a viewing device of the above stated character which can be produced at low cost from extremely inexpensive sheet materials.

A further object of the invention is to provide a kaleidoscopic peep-show viewing device which can be produced at low cost and utilized as a container for candy and other small commodities.

According to this invention, briefly summarized, there is provided a kaleidoscopic peep-show viewing device comprising an outer box of tubular shape with open opposite ends, and inner box telescopically slideable within the outer box, and an optically reflecting member of peaked solid shape having a base, vertex, and reflecting surface therebetween and joined at the base to one end of the inner box to be slideable unitarily therewith, the outer box bearing on the inner surface thereof printed inscriptions which, when viewed through one open end of the outer box as reflections on the reflecting surface of the reflecting member, are optically collected thereby into single pictures successively appearing and disappearing as the inner box is thus slid.

The nature, utility, and further features of the invention will be more clearly apparent from the following detailed description with respect to preferred embodiments of the invention when read in conjunction with the accompanying drawings, throughout which like parts are designated by like reference numerals and characters.

DETAILED DESCRIPTION

In one embodiment of this invention as illustrated in FIGS. 1, 2, 3A, 4, 5A, 5B, and 6, the viewing device comprises, essentially, an outer box A provided on its inner surface with divided pictures a, an inner box B which can be manually moved to slide telescopically in the outer box A, and an optically reflecting member of the shape of a regular, quadrangular pyramid secured at its base to one end of the inner box B.

Figure 1:
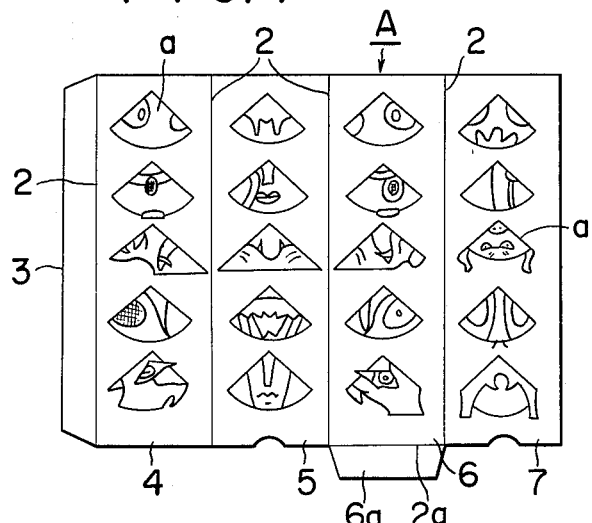
FIG. 1 is a plan view showing a sheet material so cut that it can be folded and assembled to form the outer box of one example of a viewing device according to the invention, the inner surface of this sheet material with printed inscriptions being shown.

The outer box A is cut from a single piece of a relatively stiff sheet material such as paper sheet as shown in FIG. 1. This material may be opaque, or it may be translucent, in which case better illumination is afforded for viewing as described hereinafter. The sheet material, which is cut in the shape shown, comprises a gluing tab 3, a front wall 4, a side wall 5, a rear wall 6, an end tab 6a, and a side wall 7 successively and consecutively disposed and divided by four longitudinal fold lines 2 and one transverse fold line 2a. On the inner surface of each of the four walls are printed a series of varying pictures or inscriptions a. Examples of these inscriptions are: quick-change images of supernatural characters of adventure comics; pictures showing the process of growth of an animal such as an insect from an egg through the larval stage to the adult insect; pictures showing the blooming of a flower from a bud; and letter characters.

The four inscriptions a printed in one transverse row (horizontal row as viewed in FIG. 1) on the walls 4, 5, 6, and 7 are designed to form a single picture when viewed in the manner described hereinafter. The pictures thus formed vary from row to row.

Figure 2:
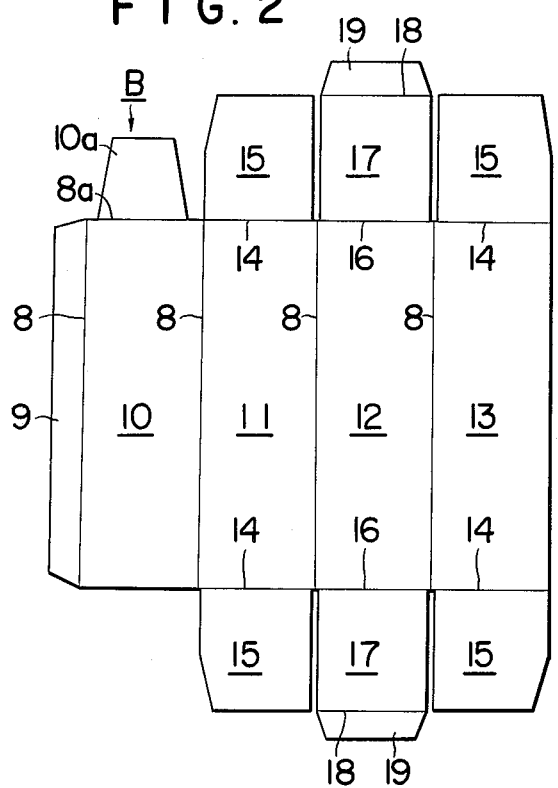
FIG. 2 is a plan view showing a sheet material so cut that it can be folded and assembled to form the inner box of the same viewing device.

The inner box B is also cut from a single piece of a relative stiff sheet material in the shape shown in FIG. 2 and comprises a gluing tab 9, a front wall 10, an end tab 10a, a side wall 11, end tabs 15, a rear wall 12, lid walls 17, end tabs 19, a side wall 13, and end tabs 15 all of integral structure and divided by four longitudinal fold lines 8 and nine transverse fold lines 8a, 14, 16, 18, and 19 as shown.

Figure 3A:
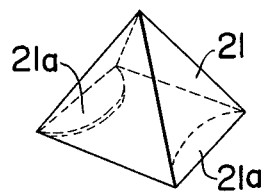
FIG. 3A is a perspective view showing one example of an optically reflecting member of use in the same viewing device.

An example of the reflecting mirror member 21 of the shape of a regular, quadrangular pyramid is shown in FIG. 3A. This member is formed by cutting out the wall and tab parts from a film of stiff polyvinyl chloride resin on which aluminum has been deposited by evaporation, folding the film, and gluing.

Figure 4:
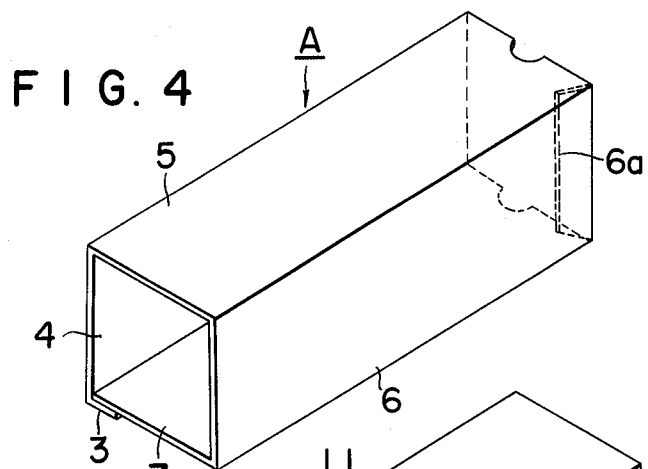
FIG. 4 is a perspective view showing the outer box assembled from the sheet material shown in FIG. 1.

The above described parts of the viewing device according to this invention are assembled as follows. As shown in FIG. 4, the sheet material for the outer box A is folded through 90 degrees of angle along each of the fold lines 2 shown in FIG. 1, and the gluing tab 3 is glued to the outer surface of the side wall 7. The tab 6a is folded inward. In this manner, the outer box A of tubular form with a square cross section is formed.

Figure 5A:
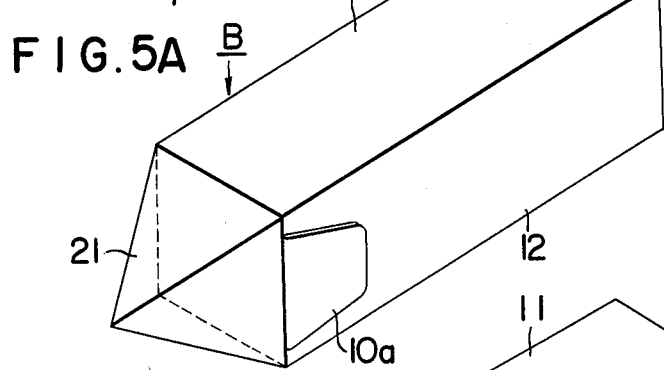
FIG. 5A is a perspective view showing the inner box assembled from the sheet material shown in FIG. 2 and supporting the reflecting member at one end thereof.
Figure 5B:
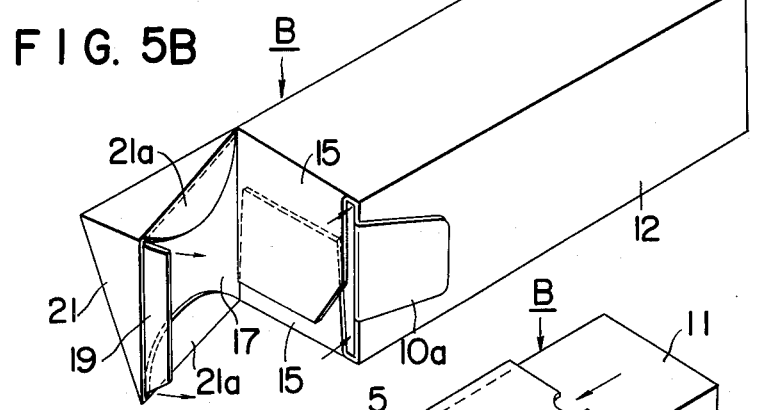
FIG. 5B is a perspective view showing the inner box after its assembly and indicating the manner in which the reflecting member is joined thereto.

The inner box B is similarly formed as indicated in FIGS. 5A and 5B by folding along the fold lines shown in FIG. 2, gluing the gluing tab 9 to the side wall 13, and folding the tabs 15, the lid walls 17, and the tabs 19 to form the lid part. The separately fabricated reflecting member 21 is then secured at its base to the lid wall 17 by folding its gluing tabs 21a. The inner box B thus formed and provided with the reflecting member 21 is then inserted into the outer box A. The tabs 6a and 10a, when folded as shown in FIGS. 4 and 5A, function cooperatively to prevent the inner box B from slipping out and separating from the outer box A at the end of the retraction stroke of the inner box.

Figure 6:
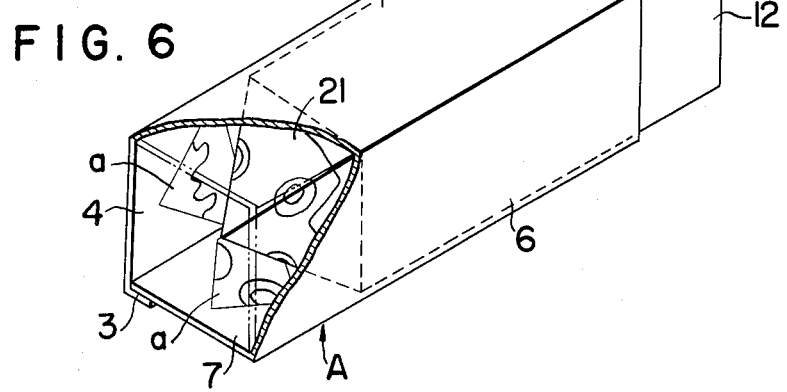
FIG. 6 is a perspective view with a part cut away, showing the inner box with reflecting member slideably inserted in the outer box.
Figure 7A:
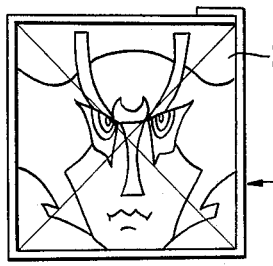
FIGS. 7A through 7E are front end views of the assembled viewing device respectively showing images of different quick-change visages of supernatural characters of adventure comics as viewed on the reflecting member of the viewing device illustrated in FIG. 6, these visages appearing successively at successively different positions of the reflecting member in the outer box.
Figure 7B:
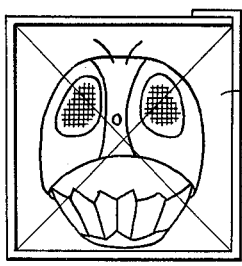
Figure 7C:
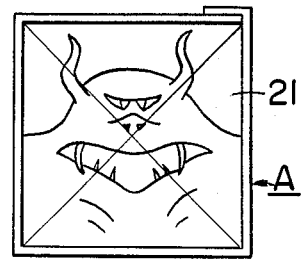
Figure 7D:
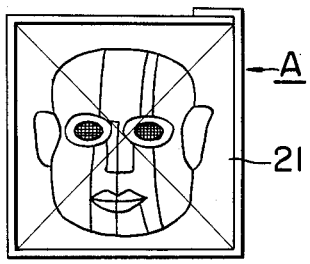
Figure 7E:
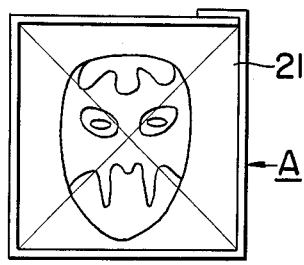

The viewing device of the above described construction according to this invention is used in the following manner. As the inner box B is caused to slide through the interior of the outer box A as indicated in FIG. 6, the reflecting member 21 is viewed head-on in the axial direction. As a result, as indicated in FIGS. 7A through 7E, the inscriptions printed on the four inner wall surfaces of the outer box A in divided state are collected by the four reflecting surfaces of the member 21 into single, coherent images which successively vary as the inner box B slides through the outer box A.

Figure 3B:
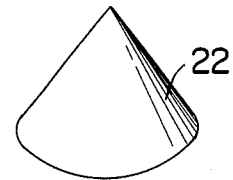
FIG. 3B is a perspective view showing one example of a conical reflecting member in another example of the viewing device.
Figure 8:
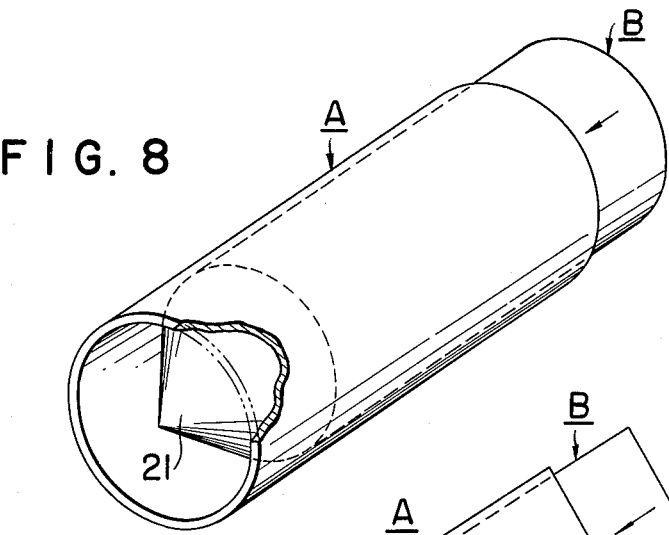
FIG. 8 is a perspective view, with a part cut away, showing another example of the viewing device according to the invention in which the reflecting member is of conical shape, and the outer and inner boxes are tubes of circular cross section.
Figure 9:
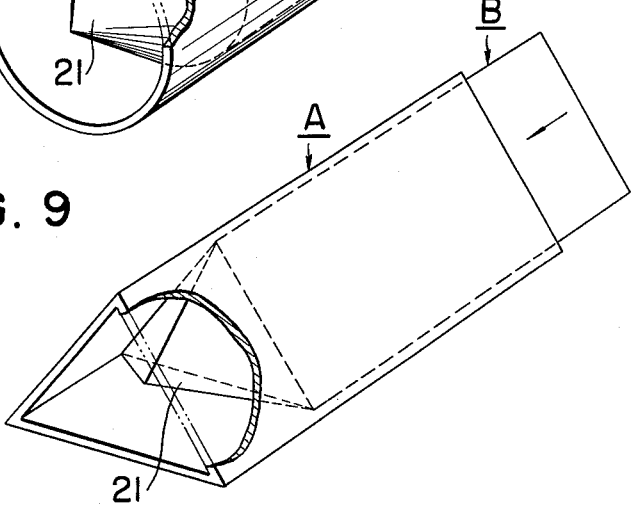
FIG. 9 is a perspective view, with a part cut away, showing still another example of the viewing device according to the invention in which the reflecting member has the shape of a triangular pyramid, and the outer and inner boxes are tubes of triangular cross section.

The viewing device according to this invention is not limited to the specific construction of the example described above. For example, the shape of the reflecting member 21 may be triangular pyramid or tetrahedron, a pentagular pyramid, a hexangular pyramid, or a pyramide with a greater number of side faces. In addition, the reflecting member 21 may have a conical shape as shown in FIG. 3B. In these cases, the cross-sectional shapes of the outer and inner boxes A and B are preferably a triangle as shown in FIG. 9, a pentagon, a hexagon, a polygon of more than six sides, or a circle as shown in FIG. 8. Furthermore, the reflecting surfaces of the reflecting member 21 are not limited to planar surfaces but may be curved surfaces of single or double curvature.

Furthermore, the materials for the reflecting member 21 are not limited to the aforementioned polyvinyl chloride film and vacuum-deposited aluminum. That is, use can be made of films of other synthetic resins such as acetates and polyesters and vacuum-deposited aluminum. Examples of other useable materials are: aluminum foil laminated on paper and glass mirrors and metal mirrors. Other methods of fabricating the reflecting member 21 are vacuum molding of an aluminum vacuum-deposited film and vacuum-deposition of aluminum on the surface of a plastics structure formed by a process such as injection molding.

A unique feature of the viewing device of this invention is that, because of the three-dimensional and multiple-facet nature of the reflecting member 21, the viewed picture appears to be a three-dimensional picture. Another feature of the device is a "zooming" effect attained when the inner box B is advancing toward the viewer. This is caused by the fact that a new picture starts to appear as a minute point at the vertex of the reflecting member 12 and rapidly expands into a full picture, which thereafter disintegrates toward the four sides of the picture frame, whereupon the succeeding picture appears at the vertex. When the inner box B is retracting, the movements of the four elements of each picture are reversed.

While the case wherein incriptions such as visages are caused to vary intermittently has been described in the above presented example, it is also possible to print images such as suitably selected scenery and abstract pictures with vary continuously.

From the foregoing disclosure, it will be apparent the viewing device of this invention can be utilized in various useful ways as a toy and as teaching material. Furthermore, the inner box B can be adapted to serve as a container for candies and other goods thereby to promote the sales of such commodities.

I claim:

1. A kaleidoscopic peep-show viewing device comprising:
    an outer box of tubular shape having a polygonal cross-section and first and second open opposite ends, said outer box being fabricated by folding a sheet of relatively stiff material, said outer box further having at said first open end thereof a first bendable tab folded inwardly thereof;

an inner box of polygonal cross-section, telescopically slidable within said outer box, said inner box being fabricated by folding a sheet of relatively stiff material, said inner box further having, at an end remote from said first open end of said outer box having said first tab, a second bendable tab coupled to said inner box and folded outwardly, said first tab of said outer box and said second tab of said inner box being interposed between the mutually slidable inner and outer surfaces of said outer and inner boxes respectively and being mutually engageable to prevent the inner box from being slipped out of said outer box when said inner box is slid outward from said outer box through said open end of said outer box;

a lid wall foldably connected to said inner box at the end thereof adjacent said second open end of said outer box and closing said end of said inner box; and an optically reflecting member of hollow pyramidal shape fabricated by folding a sheet of material and having a base part, vertex and reflecting surfaces, said reflecting member having a third tab member coupled to said reflecting member at the base part thereof and folded to engage the surface of said lid wall facing the interior of the inner box thereby connecting said reflecting member to that end of the inner box where said lid wall is provided, said reflecting member joined to said inner box so as to extend outwardly from said inner box toward said second open end of said outer box, said outer box having on the inner surface thereof printed inscriptions which, when viewed through said second open end of said outer box, has reflections on said reflecting surfaces which are optically collected into single pictures successively appearing and disappearing as said inner box is slid within said outer box.

2. A kaleidoscopic peep-show viewing device according to claim 1 in which the solid shape of the reflecting member is a regular pyramid and th cross-sectional shape of the interior of the outer box is substantially the shape of the base of a pyramid.

3. A kaleidoscopic peep-show viewing device according to claim 2 in which the solid shape of the reflecting member is a regular quadrangular pyramid.

4. A kaleidoscopic peep-show viewing device according to claim 2 in which the solid shape of the reflecting member is a regular triangular pyramid.

5. A kaleidoscopic peep-show viewing device according to claim 1 in which the reflecting member comprises an outer reflecting mirror layer adhering to the outer surfaces thereof of the base part of said reflecting member, said reflecting mirror layer being aluminum aluminum foil, highly reflective metal sheets and mirrored glass 6. A kaleidoscopic peep-show viewing device according to claim 1 in which the outer box is made of a translucent material.

7. A kaleidoscopic peep-show viewing device according to claim 1 in which the inscriptions are so printed as to depict successive stages in a natural phenomenon when viewed as reflected pictures on the reflecting surface of the reflecting member.

8.. A kaleidoscopic peep-show viewing device according to claim 1 in which the inscriptions are so printed as to depict successive quick change visages of characters when viewed as reflected pictures on the reflecting surface of the reflecting member.

9. A kaleidoscopic peep-show viewing device according to claim 1 further including a pair of tabs foldably connected to the inner box at the end thereof where said lid wall is provided and closing said end of said inner box, said pair of tabs being disposed inwardly thereof and in direct contact with said lid wall.

10. A kaleidoscopic peep-show viewing device according to claim 1 further including a small tab foldably and integrally connected to said lid wall along the free end edge thereof and engaging in face-to-face relationship with the inner surface of said inner box when th lid wall closes the end of said inner box.

* * * * *